US 12,203,413 B1

United States Patent
Hanrahan

(10) Patent No.: US 12,203,413 B1
(45) Date of Patent: Jan. 21, 2025

(54) BEARING CONFIGURATION FOR A ROTATIONAL EQUIPMENT ASSEMBLY

(71) Applicant: Raytheon Technologies Corporation, Farmington, CT (US)

(72) Inventor: Paul R. Hanrahan, Sedona, AZ (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/215,957

(22) Filed: Jun. 29, 2023

(51) Int. Cl.
| | |
|---|---|
| *F02C 7/06* | (2006.01) |
| *F01D 25/16* | (2006.01) |
| *F01D 25/22* | (2006.01) |
| *F02C 3/04* | (2006.01) |
| *F16C 17/02* | (2006.01) |

(52) U.S. Cl.
CPC ............... *F02C 7/06* (2013.01); *F01D 25/16* (2013.01); *F01D 25/22* (2013.01); *F01D 25/162* (2013.01); *F02C 3/04* (2013.01); *F05D 2240/50* (2013.01); *F16C 17/024* (2013.01); *F16C 2360/23* (2013.01)

(58) Field of Classification Search
CPC ........ F01D 25/16; F01D 25/162; F01D 25/22; F02C 7/06; F05D 2240/50; F16C 17/024
See application file for complete search history.

(56) References Cited

U.S. PATENT DOCUMENTS

| | | | | |
|---|---|---|---|---|
| 3,951,474 A | * | 4/1976 | Hughes | .................... F16C 21/00 |
| | | | | 384/103 |
| 4,300,806 A | * | 11/1981 | Heshmat | ................ F16C 17/042 |
| | | | | 384/103 |
| 4,402,618 A | | 9/1983 | Fortmann | |
| 7,269,938 B2 | | 9/2007 | Moniz | |
| 9,657,594 B2 | | 5/2017 | Klusman | |
| 2006/0218935 A1 | * | 10/2006 | Singh | ..................... F01D 25/162 |
| | | | | 60/803 |
| 2016/0363003 A1 | | 12/2016 | Davidson | |
| 2018/0003079 A1 | | 1/2018 | Madge | |
| 2021/0270184 A1 | * | 9/2021 | Mei | ........................... F02C 7/06 |

OTHER PUBLICATIONS

EP Search Report for EP Patent Application No. 24185793.7 dated Dec. 3, 2024.

* cited by examiner

*Primary Examiner* — Todd E Manahan
*Assistant Examiner* — Rene D Ford
(74) *Attorney, Agent, or Firm* — Getz Balich LLC

(57) ABSTRACT

An assembly for rotational equipment includes a shaft, a first rolling-element bearing, a second rolling-element bearing, and a mid-shaft foil bearing. The shaft extends along a rotational axis between and to a first axial end and a second axial end. The shaft is configured for rotation about the rotational axis. The first rolling-element bearing is disposed at the first axial end. The second rolling-element bearing is disposed at the second axial end. The mid-shaft foil bearing is disposed axially between the first rolling-element bearing and the second rolling-element bearing.

11 Claims, 4 Drawing Sheets

BEARING CONFIGURATION FOR A ROTATIONAL EQUIPMENT ASSEMBLY

BACKGROUND

1. Technical Field

This disclosure relates generally to rotational equipment and, more particularly, to bearing configurations for rotational equipment.

2. Background Information

Rotational equipment, such as a rotational assembly for an aircraft gas turbine engine, may generally include one or more bearings for rotationally supporting rotating components. Various types and configurations of bearings are known in the art. While these known bearings have various advantages, there is still room in the art for improvement. There is a need in the art, therefore, for an improved bearing configuration for rotational equipment.

SUMMARY

It should be understood that any or all of the features or embodiments described herein can be used or combined in any combination with each and every other feature or embodiment described herein unless expressly noted otherwise.

According to an aspect of the present disclosure, an assembly for rotational equipment includes a shaft, a first rolling-element bearing, a second rolling-element bearing, and a mid-shaft foil bearing. The shaft extends along a rotational axis between and to a first axial end and a second axial end. The shaft is configured for rotation about the rotational axis. The first rolling-element bearing is disposed at the first axial end. The second rolling-element bearing is disposed at the second axial end. The mid-shaft foil bearing is disposed axially between the first rolling-element bearing and the second rolling-element bearing.

In any of the aspects or embodiments described above and herein, the mid-shaft foil bearing may be an unlubricated bearing.

In any of the aspects or embodiments described above and herein, the shaft may have a first diameter at the first axial end and a second diameter at the mid-shaft foil bearing, and the second diameter may be greater than the first diameter.

In any of the aspects or embodiments described above and herein, the first rolling-element bearing may have a first rolling-element configuration, the second rolling-element bearing may have a second rolling-element configuration, and the first rolling-element configuration may be different than the second rolling-element configuration.

In any of the aspects or embodiments described above and herein, the assembly may further include a first bladed rotor and a second bladed rotor. The shaft may interconnect the first bladed rotor and the second bladed rotor. The mid-shaft foil bearing may be disposed axially between the first bladed rotor and the second bladed rotor.

A gas turbine engine for an aircraft propulsion system includes a bladed compressor rotor and a bladed turbine rotor, a shaft, a first rolling-element bearing, a second rolling-element bearing, and a mid-shaft foil bearing. The shaft extends along a rotational axis between and to a first axial end and a second axial end. The shaft is configured for rotation about the rotational axis. The shaft interconnects the bladed compressor rotor and the bladed turbine rotor. The first rolling-element bearing is disposed axially forward of the bladed compressor rotor. The second rolling-element bearing is disposed axially aft of the bladed turbine rotor. The mid-shaft foil bearing is disposed axially between the bladed compressor rotor and the bladed turbine rotor.

In any of the aspects or embodiments described above and herein, the mid-shaft foil bearing may include a top foil, a bump foil, and a housing. The top foil may circumscribes the shaft, the bump foil may circumscribe the top foil, and the housing may circumscribe the bump foil.

In any of the aspects or embodiments described above and herein, the first rolling-element bearing may be disposed at the first axial end.

In any of the aspects or embodiments described above and herein, the second rolling-element bearing may be disposed at the second axial end.

In any of the aspects or embodiments described above and herein, the gas turbine engine may further include a combustor section disposed axially between the bladed compressor rotor and the bladed turbine rotor. The combustor section may include a combustor. The mid-shaft foil bearing may be disposed within the combustor section.

In any of the aspects or embodiments described above and herein, the combustor section may further include a diffuser case disposed between the bladed compressor rotor and the combustor. The mid-shaft foil bearing may be disposed at an axial position of the diffuser case.

In any of the aspects or embodiments described above and herein, the mid-shaft foil bearing may be mounted to the diffuser case.

In any of the aspects or embodiments described above and herein, the shaft may have a first diameter at the first axial end, a second diameter at the second axial end, and a third diameter at the mid-shaft foil bearing. The third diameter may be greater than the first diameter and the second diameter.

In any of the aspects or embodiments described above and herein, the gas turbine engine may further include a bladed fan rotor. The shaft may interconnect the bladed fan rotor with the bladed compressor rotor and the bladed turbine rotor. The first rolling-element bearing may be disposed axially forward of the bladed fan rotor.

According to another aspect of the present disclosure, a gas turbine engine for an aircraft propulsion system includes a bladed compressor rotor and a bladed turbine rotor, a shaft, a first liquid-lubricated bearing, a second liquid-lubricated bearing, and an unlubricated mid-shaft foil bearing. The shaft extends along a rotational axis between and to a first axial end and a second axial end. The shaft is configured for rotation about the rotational axis. The shaft interconnects the bladed compressor rotor and the bladed turbine rotor. The first liquid-lubricated bearing is disposed at the first axial end. The second liquid-lubricated bearing is disposed at the second axial end. The unlubricated mid-shaft foil bearing is disposed axially between the bladed compressor rotor and the bladed turbine rotor.

In any of the aspects or embodiments described above and herein, the mid-shaft foil bearing may include a top foil, a bump foil, and a housing. The top foil may circumscribes the shaft, the bump foil may circumscribe the top foil, and the housing may circumscribe the bump foil.

In any of the aspects or embodiments described above and herein, the shaft may have a first diameter at the first axial end, a second diameter at the second axial end, and a third diameter at the mid-shaft foil bearing. The third diameter may be greater than the first diameter and the second diameter.

In any of the aspects or embodiments described above and herein, each of the first liquid-lubricated bearing and the second liquid-lubricated bearing may be a rolling-element bearing.

In any of the aspects or embodiments described above and herein, the gas turbine engine may further include a bladed fan rotor. The shaft may interconnect the bladed fan rotor with the bladed compressor rotor and the bladed turbine rotor. The first liquid-lubricated bearing may be disposed axially forward of the bladed fan rotor.

In any of the aspects or embodiments described above and herein, the gas turbine engine may further include a combustor section disposed axially between the bladed compressor rotor and the bladed turbine rotor. The combustor section may include a combustor and a diffuser case. The diffuser case may be disposed between the bladed compressor rotor and the combustor. The mid-shaft foil bearing may be mounted to the diffuser case.

The present disclosure, and all its aspects, embodiments and advantages associated therewith will become more readily apparent in view of the detailed description provided below, including the accompanying drawings.

DETAILED DESCRIPTION

Figure 1:
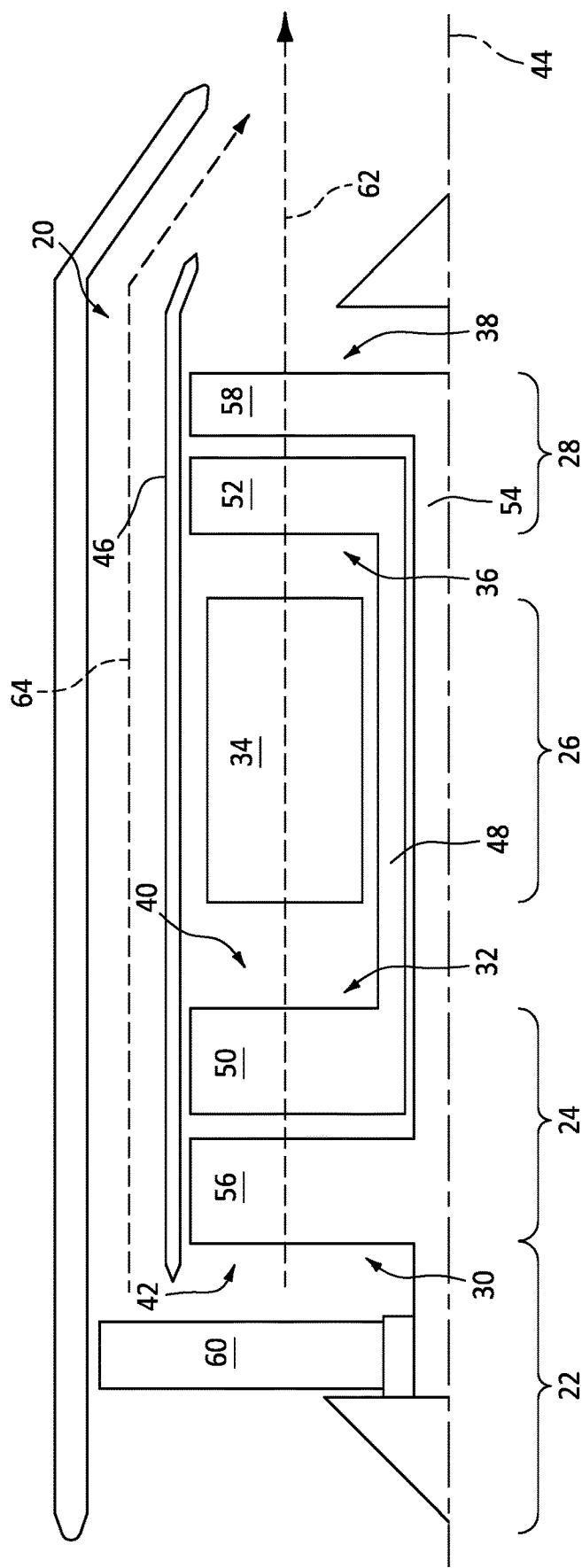
FIG. 1 schematically illustrates a cutaway, side view of a gas turbine engine for an aircraft propulsion system, in accordance with one or more embodiments of the present disclosure.

FIG. 1 schematically illustrates a gas turbine engine 20. The gas turbine engine 20 of FIG. 1 is a multi-spool turbofan gas turbine engine for an aircraft propulsion system. However, while the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine.

The gas turbine engine 20 of FIG. 1 includes a fan section 22, a compressor section 24, a combustor section 26, and a turbine section 28. For example, the compressor section 24 of FIG. 1 includes a low-pressure compressor (LPC) 30 and a high-pressure compressor (HPC) 32, the combustor section 26 includes a combustor 34 (e.g., an annular combustor), and the turbine section 28 includes a high-pressure turbine (HPT) 36 and a low-pressure turbine (LPT) 38.

The gas turbine engine 20 sections 22, 26, 28 form a first rotational assembly 40 (e.g., a high-pressure spool) and a second rotational assembly 42 (e.g., a low-pressure spool) of the gas turbine engine 20. The first rotational assembly 40 and the second rotational assembly 42 are mounted for rotation about a rotational axis 44 (e.g., an axial centerline of the gas turbine engine 20) relative to the engine static structure 46 of the gas turbine engine 20. The engine static structure 46 may include one or more engine cases, cowlings, bearing assemblies, and/or other non-rotating structures configured to house and/or support components of the gas turbine engine 20 sections 22, 24, 26, 28. For example, as will be discussed in further detail, the engine static structure 46 may include one or more bearing assemblies for rotationally supporting components of the first rotational assembly 40 and/or the second rotational assembly 42.

The first rotational assembly 40 includes a first shaft 48, a bladed first compressor rotor 50 for the high-pressure compressor 32, and a bladed first turbine rotor 52 for the high-pressure turbine 36. The first shaft 48 interconnects the bladed first compressor rotor 50 and the bladed first turbine rotor 52.

The second rotational assembly 42 includes a second shaft 54, a bladed second compressor rotor 56 for the low-pressure compressor 30, and a bladed second turbine rotor 58 for the low-pressure turbine 38. The second shaft 54 interconnects the bladed second compressor rotor 56 and the bladed second turbine rotor 58. The second shaft 54 of FIG. 1 additionally interconnects the bladed second compressor rotor 56 and the bladed second turbine rotor 58 with a bladed fan rotor 60 for the fan section 22. The second shaft 54 may alternatively be coupled to the bladed fan rotor 60 (e.g., an input shaft of the bladed fan rotor 60) by a reduction gear assembly configured to drive the bladed fan rotor 60 at a reduced rotational speed relative to the second shaft 54.

In operation of the gas turbine engine 20 of FIG. 1, ambient air is directed through the fan section 22 and into a core flow path 62 and a bypass flow path 64 by rotation of the bladed fan rotor 60. Airflow along the core flow path 62 is compressed by the low-pressure compressor 30 and the high-pressure compressor 32, mixed and burned with fuel in the combustor 34, and then directed through the high-pressure turbine 36 and the low-pressure turbine 38. The bladed first turbine rotor 52 and the bladed second turbine rotor 58 rotationally drive the first rotational assembly 40 and the second rotational assembly 42, respectively, in response to the combustion gas flow through the high-pressure turbine 36 and the low-pressure turbine 38. The first shaft 48 and the second shaft 54 are concentric and rotate about the rotational axis 44. The present disclosure, however, is not limited to concentric configurations of the first shaft 48 and the second shaft 54 and the first shaft 48 and the second shaft 54 may alternatively be configured for rotation about discrete rotational axes.

Figure 2:
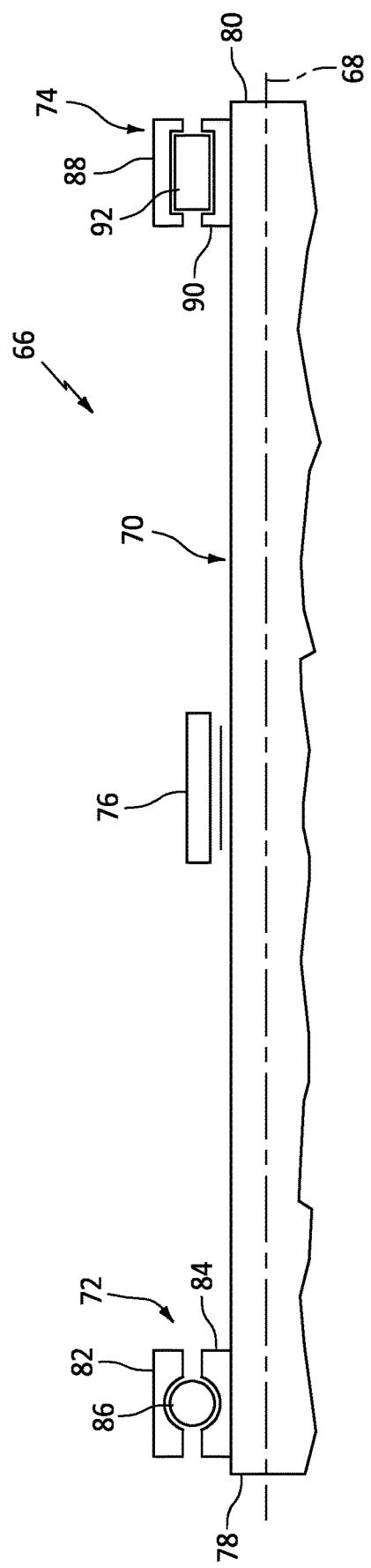
FIG. 2 illustrates a cutaway, side view of a rotational equipment assembly, in accordance with one or more embodiments of the present disclosure.

FIG. 2 illustrates an assembly 66 for rotational equipment with a rotational axis 68 (e.g., an axial centerline of the rotational equipment assembly 66). Example of such rotational equipment include the first rotational assembly 40 and the second rotational assembly 42 of the gas turbine engine 20 FIG. 1. However, the rotational equipment assembly 66 is not limited to use with aircraft or gas turbine engine (e.g., the gas turbine engine 20) applications. The rotational equipment assembly 66 may alternatively be configured with rotational equipment such as an industrial gas turbine engine, a wind turbine, a water turbine, or any other rotational equipment including a plurality of bearings.

The rotational equipment assembly 66 of FIG. 2 includes a rotatable base structure 70. The rotational equipment assembly 66 further includes a first bearing 72, a second bearing 74, and a mid-shaft foil bearing 76 for rotationally supporting the rotatable assembly 70 relative to a static structure (not shown in FIG. 2) of the rotational equipment assembly 66.

The rotatable base structure 70 of FIG. 2 is configured as a tubular shaft. Examples of the rotatable base structure 70 may include, but are not limited to, the first shaft 48 and the second shaft 54 (see FIG. 1). The rotatable base structure 70 extends axially along the rotational axis 68. The rotatable base structure 70 extends (e.g., axially extends) between and to a first axial end 78 of the rotatable base structure 70 and a second axial end 80 of the rotatable base structure 70. The rotatable base structure 70 extends circumferentially about (e.g., completely around) the rotational axis 68.

The first bearing 72 and the second bearing 74 of FIG. 2 are configured as rolling-element bearings. Examples of rolling-element bearings include, but are not limited to, ball rolling-element bearings, cylindrical rolling-element bearings, spherical rolling-element bearings, tapered rolling-element bearings, and needle rolling-element bearings. The first bearing 72 and the second bearing 74 may have a same rolling element configuration. However, as will be discussed in further detail, the first bearing 72 and the second bearing 74 may alternatively have different rolling element configurations. The first bearing 72 and the second bearing 74 are liquid-lubricated bearings. For example, the first bearing 72 and the second bearing 74 may be lubricated and cooled using a fuel lubricant, an oil lubricant, or another suitable liquid lubricant. While the first bearing 72 and the second bearing 74 are described above and herein as rolling-element bearings, the present disclosure is not limited to the foregoing exemplary rolling-element bearing configuration for the first bearing 72 and the second bearing 74, and the first bearing 72 and the second bearing 74 may alternatively have other liquid-lubricated bearing configurations such as, but not limited to, a duplex bearing configuration.

The first bearing 72 of FIG. 2 is disposed at (e.g., on, adjacent, or proximate) the first axial end 78 (e.g., a forward end) of the rotatable base structure 70. The first bearing 72 includes an annular outer race 82, an annular inner race 84, and a plurality of bearing elements 86. The outer race 82 circumscribes the inner race 84 and the bearing elements 86. The outer race 82 may be mounted to a static structure of the rotational equipment assembly 66. The inner race 84 circumscribes and is mounted to the rotatable base structure 70 at (e.g., on, adjacent, or proximate) the first axial end 78. The bearing elements 86 are arranged in an annular array about the rotational axis 68, which array is disposed radially between and engaged with (e.g., contacts) the outer race 82 and the inner race 84. The bearing elements 86 of FIG. 2 are configured as ball bearing elements. The present disclosure, however, is not limited to the foregoing exemplary bearing configuration for the first bearing 72 of FIG. 2.

The second bearing 74 of FIG. 2 is disposed at (e.g., on, adjacent, or proximate) the second axial end 80 (e.g., an aft end) of the rotatable base structure 70. The second bearing 74 includes an annular outer race 88, an annular inner race 90, and a plurality of bearing elements 92. The outer race 88 circumscribes the inner race 90 and the bearing elements 92. The outer race 88 may be mounted to a static structure of the rotational equipment assembly 66. The inner race 90 circumscribes and is mounted to the rotatable base structure 70 at (e.g., on, adjacent, or proximate) the second axial end 80. The bearing elements 92 are arranged in an annular array about the rotational axis 68, which array is disposed radially between and engaged with (e.g., contacts) the outer race 88 and the inner race 90. The bearing elements 92 of FIG. 2 are configured as cylindrical bearing elements. The present disclosure, however, is not limited to the foregoing exemplary bearing configuration for the second bearing 74 of FIG. 2.

In some cases, a rotational equipment assembly (e.g., the rotational equipment assembly 66) may include a mid-shaft, third bearing to address one or more rotordynamic concerns. For example, a mid-shaft bearing may be used to stabilize a high-speed, dynamic mode of deflection for a shaft of the rotational equipment assembly. For some rotational equipment assembly configurations, the use of a rolling-element bearing (e.g., the first bearing 72 or the second bearing 74) at a mid-shaft position of the rotational equipment assembly may be difficult. For example, a rolling-element bearing at a mid-shaft position may require additional lubrication and/or cooling to facilitate suitable rolling speed capability for the rolling-element bearing. A rolling-element bearing may additionally require pressurized air from a buffering system at bearing compartment boundaries to separate lubricant within the bearing compartment from air outside the bearing compartment. Systems configuration to facilitate lubrication, cooling and/or buffering of a mid-shaft rolling-element bearing may contribute additional weight, complexity, and cost to the rotational equipment assembly.

The rotational equipment assembly 66 of FIG. 2 includes the mid-shaft foil bearing 76 at a mid-shaft position of the rotatable base structure 70. The mid-shaft foil bearing 76 is disposed axially between the first bearing 72 and the second bearing 74. For example, the mid-shaft foil bearing 76 may be axially spaced from the first bearing 72 and the second bearing 74.

Figure 3:
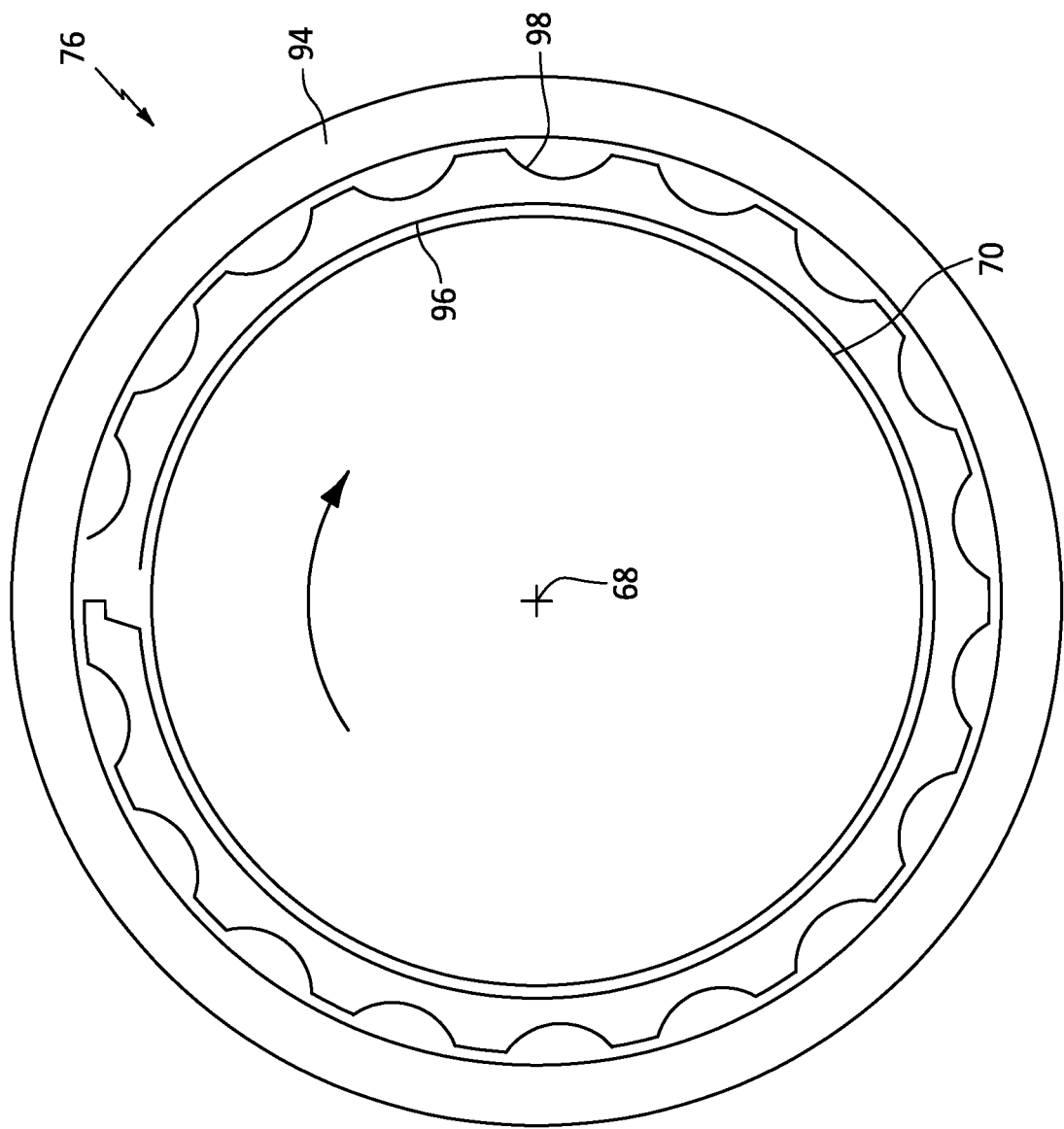
FIG. 3 illustrates a cutaway view of a portion of the rotational equipment assembly of FIG. 2, in accordance with one or more embodiments of the present disclosure.

FIG. 3 illustrates a cutaway view of the rotatable base structure 70 and an exemplary configuration of the mid-shaft foil bearing 76. The mid-shaft foil bearing 76 of FIG. 3 (e.g., a radial foil bearing) includes a bearing housing 94, a first foil 96 (e.g., a "top foil"), and a second foil 98 (e.g., a "bump foil"). The bearing housing 94 circumscribes the first foil 96, the second foil 98, and the rotatable base structure 70. The bearing housing 94 may be mounted to a static structure of the rotational equipment assembly 66. The first foil 96 is disposed adjacent (e.g., radially adjacent) the rotatable base structure 70. The first foil 96 may circumscribe the rotatable base structure 70. The first foil 96 may include a plurality of circumferential foil segments, which circumferential foil segments may be arranged together to circumscribe the rotatable base structure 70. The first foil 96 may form a sliding surface for the rotatable base structure 70. The second foil 98 is disposed between (e.g., radially between) the bearing housing 94 and the first foil 96. The second foil 98 may circumscribe the first foil 96 and the rotatable base structure 70. The second foil 98 may include a plurality of circumferential foil segments, which circumferential foil segments may be arranged together to circumscribe the first foil 96 and the rotatable base structure 70. The second foil 98 is configured with bumps, corrugations, or other wave structures to facilitate a compliant support structure for the mid-shaft foil bearing 76. The present disclosure, however, is not limited to the foregoing exemplary configuration for the mid-shaft foil bearing 76 of FIG. 3. In contrast to the first bearing 72 and the second bearing 74, the mid-shaft foil bearing 76 may be understood as an unlubricated bearing which does not require a liquid lubricant.

In operation, rotation of the rotatable base structure 70 about the rotational axis 68 drags fluid (e.g., air) into the mid-shaft foil bearing 76 between the first foil 96 and the rotatable base structure 70. This fluid flow into the mid-shaft foil bearing lifts the rotatable base structure 70 relative to the mid-shaft foil bearing 76 such that the rotating rotatable base structure 70 is separated from the mid-shaft foil bearing 76 by a fluid (e.g., air) gap (e.g., at normal operating speeds of the rotatable base structure 70). The mid-shaft foil bearing 76 may, therefore, facilitate rotational support for the rotatable base structure 70 at a mid-shaft position without the use of lubrication and/or cooling air. The mid-shaft foil bearing 76 may exhibit a lower load-carrying capacity for the rotatable base structure 70 at relatively low rotatable base structure 70 rotation speeds, for example, in comparison to rolling-element bearings, such as the first bearing 72 and the second bearing 74. However, where the mid-shaft foil bearing 76 is used to facilitate high-speed support of the rotatable base structure 70 to limit rotatable base structure 70 deflection, the relatively lower load-carrying capacity of the mid-shaft foil bearing 76 may be acceptable in view of the improvements in weight, complexity, and cost of the rotational equipment assembly 66.

Figure 4:
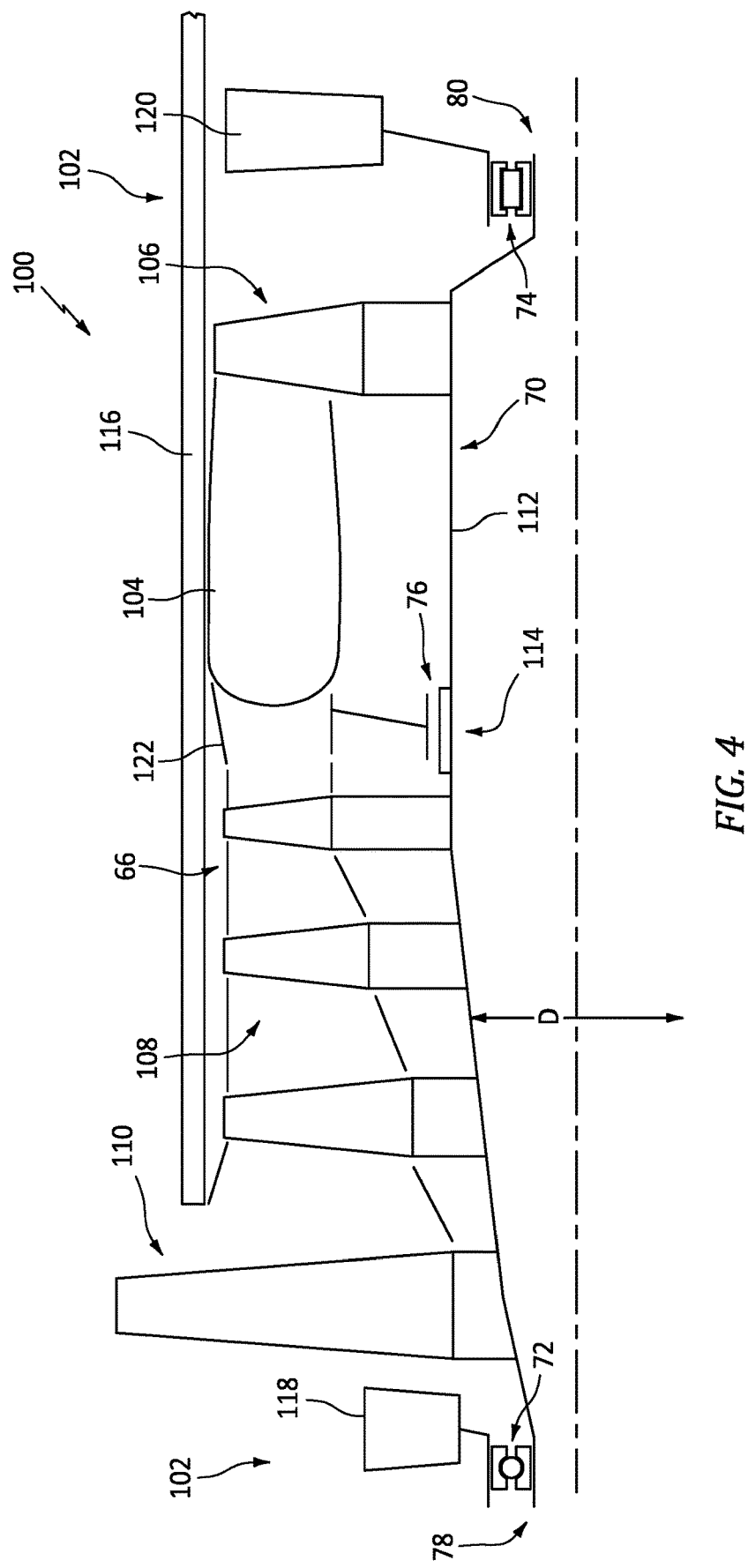
FIG. 4 schematically illustrates a cutaway, side view of another gas turbine engine for an aircraft propulsion system, in accordance with one or more embodiments of the present disclosure.

FIG. 4 schematically illustrates a portion of an exemplary configuration of a gas turbine engine 100 for an aircraft propulsion system. The gas turbine engine 100 of FIG. 4 includes an embodiment of the rotational equipment assembly 66, an engine static structure 102, and a combustor 104. The gas turbine engine 100 of FIG. 4 is a single-spool configuration, which single-spool is formed by the rotational equipment assembly 66.

The rotational equipment assembly 66 of FIG. 4 includes a bladed turbine rotor 106, a bladed compressor rotor 108, and a bladed fan rotor 110 interconnected by the rotatable base structure 70. The rotatable base structure 70 of FIG. 4 is configured as a tubular shaft 112. The tubular shaft 112 of FIG. 4 has a variable diameter. A diameter D of the tubular shaft 112 varies along an axial span of the tubular shaft 112 between the first axial end 78 and the second axial end 80. For example, the diameter D is greater at a mid-shaft position 114 of the tubular shaft 112 than at the first axial end 78 or the second axial end 80. The present disclosure, however, is not limited to the foregoing exemplary tubular shaft 112 configuration of FIG. 4.

The engine static structure 102 of FIG. 4 includes an engine case 116, a first bearing support assembly 118, and a second bearing support assembly 120. The engine case 116 may be formed, for example, by a plurality of discrete cases assembled together to surround and support the rotational equipment assembly 66. The first bearing assembly 118 and the second bearing assembly 120 may form or otherwise include, for example, a bearing compartment, a lubrication system, and/or a pressurized-air buffering system to support operation of the first bearing 72 and the second bearing 74, respectively. The engine static structure 102 of FIG. 4 further includes a diffuser case 122. The diffuser case 122 is disposed between the bladed compressor rotor 108 and the combustor 104 to drive compressed core air into the combustor 104 for mixing and burning with a fuel supplied to the combustor 104.

The first bearing 72 of FIG. 4 is disposed on the tubular shaft 112 forward (e.g., axially forward) of the bladed fan rotor 110. The second bearing 74 of FIG. 4 is disposed on the tubular shaft 112 aft (e.g., axially aft) of the bladed turbine rotor 106. Accordingly, the first bearing 72 and the second bearing 74 may be understood to be disposed outside of the torque path for the rotational equipment assembly 66 of FIG. 4, where the relatively smaller diameter D of the tubular shaft 112 may facilitate a reduced shear stress experienced by the first bearing 72 and the second bearing 74 and where lubrication and cooling of the first bearing 72 and the second bearing 74 may be more easily provided. The mid-shaft foil bearing 76 of FIG. 4 is disposed on the tubular shaft 112 axially between the first bearing 72 and the second bearing 74 and within the torque path for the rotational equipment assembly 66 of FIG. 4. For example, the mid-shaft foil bearing 76 of FIG. 4 is disposed at the mid-shaft position 114 where the diameter D of the tubular shaft 112 may be greater than at the locations of the first bearing 72 and the second bearing 74. The mid-shaft foil bearing 76, disposed at the mid-shaft position 114 may be exposed to significantly higher temperature and higher pressure air due to the proximity of the mid-shaft foil bearing 76 to the combustor 104. The mid-shaft foil bearing 76 of FIG. 4, for example, is disposed at (e.g., on, adjacent, or proximate) an axial position of the diffuser case 122 (e.g., within the combustor section 26; see FIG. 1). The mid-shaft foil bearing 76 (e.g., the bearing housing 94; see FIG. 3) is mounted to the diffuser case 122, however, the present disclosure is not limited to this particular mounting configuration of the mid-shaft foil bearing 76.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts, and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A gas turbine engine for an aircraft propulsion system, the gas turbine engine comprising:
    a bladed compressor rotor and a bladed turbine rotor;
    a combustor section disposed axially between the bladed compressor rotor and the bladed turbine rotor, the combustor section including a combustor and a diffuser case, the diffuser case disposed between the bladed compressor rotor and the combustor,
    a shaft extending along a rotational axis between and to a first axial end and a second axial end, the shaft configured for rotation about the rotational axis, and wherein the shaft interconnects the bladed compressor rotor and the bladed turbine rotor;
    a first rolling-element bearing disposed axially forward of the bladed compressor rotor;
    a second rolling-element bearing disposed axially aft of the bladed turbine rotor; and
    a mid-shaft foil bearing disposed axially between the bladed compressor rotor and the bladed turbine rotor, wherein the mid-shaft foil bearing is mounted to the diffuser case.

2. The gas turbine engine of claim 1, wherein the mid-shaft foil bearing includes a top foil, a bump foil, and a housing, the top foil circumscribes the shaft, the bump foil circumscribes the top foil, and the housing circumscribes the bump foil.

3. The gas turbine engine of claim 1, wherein the first rolling-element bearing is disposed at the first axial end.

4. The gas turbine engine of claim 1, wherein the second rolling-element bearing is disposed at the second axial end.

5. The gas turbine engine of claim 1, wherein the shaft has a first diameter at the first axial end, a second diameter at the second axial end, and a third diameter at the mid-shaft foil bearing, and the third diameter is greater than the first diameter and the second diameter.

6. The gas turbine engine of claim 1, further comprising a bladed fan rotor, the shaft interconnects the bladed fan rotor with the bladed compressor rotor and the bladed turbine rotor, and the first rolling-element bearing is disposed axially forward of the bladed fan rotor.

7. A gas turbine engine for an aircraft propulsion system, the gas turbine engine comprising:
    a bladed compressor rotor and a bladed turbine rotor;
    a combustor section disposed axially between the bladed compressor rotor and the bladed turbine rotor, the combustor section including a combustor and a diffuser case, the diffuser case disposed between the bladed compressor rotor and the combustor;
    a shaft extending along a rotational axis between and to a first axial end and a second axial end, the shaft configured for rotation about the rotational axis, and the shaft interconnecting the bladed compressor rotor and the bladed turbine rotor;
    a first liquid-lubricated bearing disposed at the first axial end;
    a second liquid-lubricated bearing disposed at the second axial end; and
    an unlubricated mid-shaft foil bearing disposed axially between the bladed compressor rotor and the bladed turbine rotor, wherein the mid-shaft foil bearing is mounted to the diffuser case.

8. The gas turbine engine of claim 7, wherein the mid-shaft foil bearing includes a top foil, a bump foil, and a housing, the top foil circumscribes the shaft, the bump foil circumscribes the top foil, and the housing circumscribes the bump foil.

9. The gas turbine engine of claim 7, wherein the shaft has a first diameter at the first axial end, a second diameter at the second axial end, and a third diameter at the mid-shaft foil bearing, and the third diameter is greater than the first diameter and the second diameter.

10. The gas turbine engine of claim 7, wherein each of the first liquid-lubricated bearing and the second liquid-lubricated bearing is a rolling-element bearing.

11. The gas turbine engine of claim 7, further comprising a bladed fan rotor, wherein the shaft interconnects the bladed fan rotor with the bladed compressor rotor and the bladed turbine rotor, and the first liquid-lubricated bearing is disposed axially forward of the bladed fan rotor.

* * * * *